(No Model.)
A. VANNATTER & A. J. AUGUST.
FUSE CUTTER AND CAP CRIMPER.
No. 376,493. Patented Jan. 17, 1888.
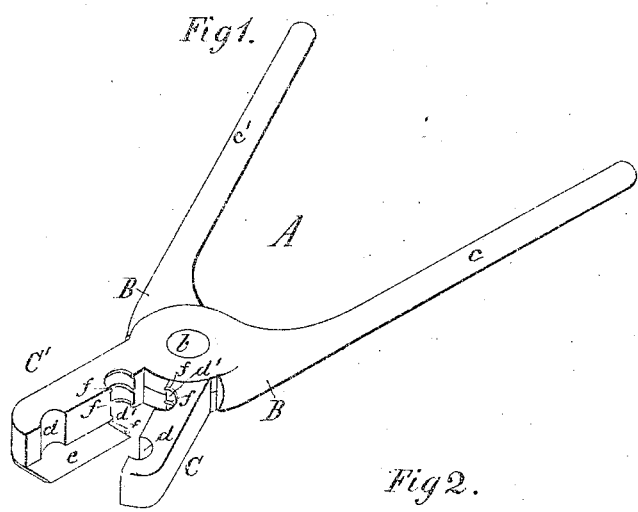
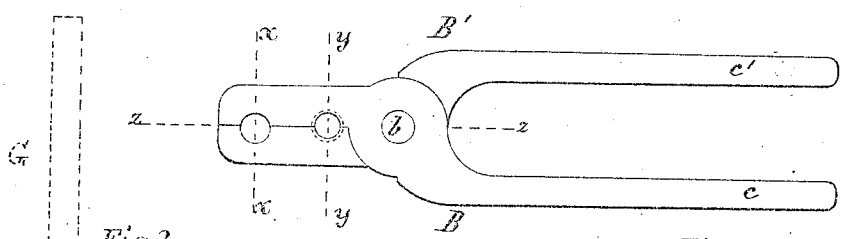
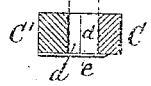
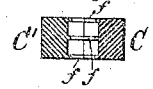
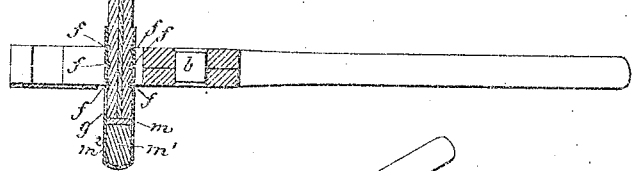
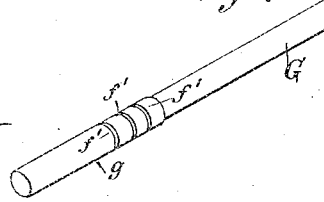
Witnesses:
Rob't L. Fenwick
Edm'd J. Fenwick
Inventor:
Albert Vannatter
Anthony J. August
by their att'ys
Mason, Fenwick and Lawrence

UNITED STATES PATENT OFFICE.

ALBERT VANNATTER AND ANTHONY J. AUGUST, OF LAWSON, COLORADO.

FUSE-CUTTER AND CAP-CRIMPER.

SPECIFICATION forming part of Letters Patent No. 376,493, dated January 17, 1888.

Application filed July 18, 1887. Serial No. 244,642. (No model.)

*To all whom it may concern:*

Be it known that we, ALBERT VANNATTER and ANTHONY J. AUGUST, citizens of the United States, residing at Lawson, in the county of Clear Creek and State of Colorado, have invented certain new and useful Improvements in Combined Fuse-Cutter and Cap-Crimper; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

In the accompanying drawings, illustrating our invention, Figure 1 is a perspective view of our combined fuse-cutter and cap-crimper, the same being shown open ready for action, either to cut off a required length of fuse for a "blast" or for crimping a metal fulminate-cap upon the same, as the case may be. Fig. 2 is a plan view of Fig. 1, the implement being shown closed. Fig. 3 is a transverse section in the line $x\ x$ of Fig. 2, showing, for example, in dotted lines a supposed length of fuse for a blast cut off from a main body portion or coil of fuse as supplied to miners for blasting purposes, such sufficient length of fuse, in fact, being cut off preparatory to supplying its end with a metal fulminate-cap, as shown in Figs. 5 and 6; and Fig. 4, a like section in the line $y\ y$ of Fig. 2, showing the circular ridges whereby the metal fulminate-cap has a portion of its length crimped down into and around a length of fuse at one of its ends, as signified in Figs. 5 and 6. Fig. 5 is a longitudinal central section of a given length of fuse for a blast, with the metal fulminate-cap in the act of being crimped thereon by the implement shown in Fig. 1, said implement being forced from its open position, as in Fig. 1, to its closed position, as in Fig. 2, during such act, this view, Fig. 5, being taken in the line $z\ z$ of Fig. 2; and Fig. 6 is a perspective view of a length of fuse for a blast with a thin copper fulminate-cap crimped thereon and completely ready for insertion into the usual length of giant-powder employed by miners for blasting rock or ores.

Our invention has for its object the facilitating of the operation of mining, in that by it the capped fuse for blasting purposes may be so manufactured that when inserted into a length or "stick" of giant-powder, as now ordinarily practiced, it is rendered water-proof, and hence there can be no failure of an explosion, due to the wetting of the fulminate within the cap.

As now practiced by miners in "blasting," a stick of giant-powder, which is usually of a size seven-eighths of an inch in diameter by eight inches in length, is cut in two and a hole made into the end of one piece of the powder, into which the cap, with the fuse, is inserted. The powder is then placed into the hole drilled in the rock or mineral, which hole is almost invariably filled with water. The hole is now tamped with fine dirt or sand and the fuse ignited. The giant-powder explodes as well under water as anywhere; but the cap will not explode if the least damp; hence the great importance of our invention, which we will now proceed to describe.

In Fig. 1 we have shown our combined fuse-cutter and cap-crimper A, composed of two limbs, B B', as shown, which in common may articulate upon the pin $b$. These limbs at their rear are made into round straight handles, as $c\ c'$, care being taken that they shall be the greater portion of their length nearly, if not quite, the diameter of the fuse usually employed by miners, the full diameter of which is shown in perspective in Fig. 6. They are so made for a purpose which will hereinafter appear. Forward of the pin $b$ the limbs B B' terminate in jaws, as C and C', the jaws each being made with half-round slots or recesses, as at $d$ and $d'$, and so as to form circular holes through the jaws when closed, as represented in Fig. 2. The jaw C' has a sharp cutting-blade, $e$, fixed to its under surface, as shown, and the half-round slots $d'\ d'$ are each constructed with projecting half-circle ridges, as at $f$. These ridges are in this instance three in number, although a greater or less number will answer their purpose, their use being to crimp or depress portions of the metal of the cap $g$ down into and all around the fuse G, as indicated in the figures, the crimped circular depressions, as at $f'$, being clearly shown in Fig. 6.

In using our combined fuse-cutter and cap-crimper a proper length of fuse for a blast may be cut from a roll of fuse by placing the fuse in the slot $d$ of jaw C when the implement is open, as shown in Fig. 1, and then closing the implement A, as shown in Fig. 2, such act cutting off, for example, a length of fuse, as shown in dotted lines in Fig. 3, above the knife-blade $e$. This done, the length of fuse so cut off is then thrust into the ordinary plain copper cap, $g$, as indicated in Figs. 5 and 6, into which fulminate and powder, as $m\,m'$, have been placed. The fuse G, with the metal cap $g$ upon it, is then placed, as shown, in one of the half-circular slots $d'$ of the jaws C C' while the implement is open, whereupon the implement is closed, as in Fig. 2, thereby forcing the crimping-ridges $f$ against the metal tube $g$ and forcing a portion of the body of the metal down into the fuse, thus forming the circular depressions $f'$ all around the fuse. This act renders it impossible for water to enter the fulminate and powder chamber $m^2$ of the tube G, which contains the fulminate, $m$, and powder, $m'$. The fulminate and powder are thus not only kept perfectly dry, but the tube $g$ is at the same time securely attached to the fuse G against casual displacement. After having "crimped" the metal cap $g$, this fuse, as shown in Fig. 6, is complete and ready for use. We then thrust one of the handles $c\,c'$ down lengthwise into one of the pieces or sticks of giant-powder above named, thus making a hole therein fitted to snugly receive the capped end of the fuse. The giant-powder is then let into the blast-hole and the same tamped with fine dirt or sand, such portions of the fuse being left to project above the blast-hole as may be desired.

It will thus be seen that our improved implement for miners' use readily serves to cut fuse into proper lengths for blasting, also for crimping and firmly attaching the fulminate-tube upon the fuse, thereby also keeping the fulminate dry, and that the straight round handles $c\,c'$ serve as hole-punchers in the stick of giant-powder, the hole thus made receiving the capped end of the fuse prior to placing the giant-powder in the blast-hole.

We thus have produced not only a most useful implement for miners' use, but we also have, as represented complete in Fig. 6, produced a new article of manufacture for miners' use in blasting rock and mineral.

What we claim as our invention, and desire to secure by Letters Patent, is—

The improved article of manufacture, to wit: an implement for cutting and capping fuse, which comprises in its construction two jaws, C C', pivoted together by pivot $b$ and provided with semi-cylindrical recesses or slots $d$ and $d'$ forward of the pivot $b$, a cutter, $e$, beneath jaw C', forward of slots $d'\,d'$, and below slots $d\,d$, crimping-ridges $f\,f$ transverse of slots $d'\,d'$, and handles $c\,c'$, rounded and forming rigid extensions of the jaws in rear of pivot $b$, substantially as and for the purpose described.

In testimony whereof we affix our signatures in presence of two witnesses.

ALBERT VANNATTER.
ANTHONY J. AUGUST.

Witnesses:
MONROE CHAPMAN,
JAMES NELSON.